(12) United States Patent
        Østergaard

(10) Patent No.: US 12,680,837 B2
(45) Date of Patent: Jul. 14, 2026

(54) COMBINED POSITION AND SENSOR SYSTEM

(71) Applicant: Sensitivus ApS, Copenhagen (DK)

(72) Inventor: Rolf Østergaard, Copenhagen (DK)

(73) Assignee: SENSITIVUS APS, Copenhagen (DK)

( * ) Notice: Subject to any disclaimer, the term of this patent is extended or adjusted under 35 U.S.C. 154(b) by 184 days.

(21) Appl. No.: 18/834,847

(22) PCT Filed: Jan. 31, 2023

(86) PCT No.: PCT/EP2023/052312
        § 371 (c)(1),
        (2) Date: Jul. 31, 2024

(87) PCT Pub. No.: WO2023/148161
        PCT Pub. Date: Aug. 10, 2023

(65) Prior Publication Data
        US 2025/0164288 A1      May 22, 2025

(30) Foreign Application Priority Data
        Feb. 1, 2022      (EP) .................................... 22154571

(51) Int. Cl.
        *G01D 5/20*              (2006.01)
(52) U.S. Cl.
        CPC .................................. *G01D 5/2053* (2013.01)
(58) Field of Classification Search
        CPC .................................................. G01D 5/2053
        See application file for complete search history.

(56) References Cited

U.S. PATENT DOCUMENTS

| | | | |
|---|---|---|---|
| 9,329,093 B2 | 5/2016 | Chana | |
| 10,498,264 B2 | 12/2019 | Hamel | |

(Continued)

FOREIGN PATENT DOCUMENTS

| | | |
|---|---|---|
| EP | 3045886 A1 | 7/2016 |
| EP | 3104496 B1 | 9/2019 |

(Continued)

OTHER PUBLICATIONS

Guide for Selecting a Rotary Torque Sensor: Brush Vs. Brushless Models, Mountz, Nov. 30, 2018, available at https://www.mountztorque. com/Guide-for-Selecting-a-Rotary-Torque-Sensor-Brush-vs.-Brushless-Models, 7 pages.

(Continued)

*Primary Examiner* — Stephanie E Bloss
*Assistant Examiner* — Michael A Harrison
(74) *Attorney, Agent, or Firm* — Boone IP Law

(57) ABSTRACT

The present disclosure relates to a combined position and sensor system comprising a stator part and rotor part, where the stator part has an AC voltage source and the rotor part is powered by inductive coupling between the stator and rotor part, and where the rotor part comprises sensor component(s), and sensor data is transmitted from the rotor part to the stator part via inductive coupling. Furthermore, a signal, which is dependent on the relative position of the stator and rotor part, is based on inductive coupling between elements on the stator and rotor. Additionally, the disclosure relates to an electric vehicle comprising the combined position and sensor system and to a method of regulating power provided by a motor control system for an electric vehicle comprising an electric motor, where the electric vehicle further comprises a combined position and sensor system.

20 Claims, 10 Drawing Sheets

(56) References Cited

U.S. PATENT DOCUMENTS

| | | | | |
|---|---|---|---|---|
| 2003/0038609 A1* | 2/2003 | Shien | ..................... | H02K 17/02 |
| | | | | 318/751 |
| 2014/0171258 A1 | 6/2014 | Boudet | | |
| 2015/0311838 A1* | 10/2015 | Moule | ....................... | H02P 6/18 |
| | | | | 318/400.26 |
| 2016/0327444 A1 | 11/2016 | Ichikawa | | |
| 2016/0352148 A1 | 12/2016 | Ichikawa | | |
| 2019/0310148 A1 | 10/2019 | Bertin | | |
| 2019/0341183 A1 | 11/2019 | Petkov | | |
| 2020/0064159 A1* | 2/2020 | Bertin | .................... | G01D 5/208 |
| 2020/0355564 A1* | 11/2020 | Venzal | .................... | G01D 5/20 |

FOREIGN PATENT DOCUMENTS

| | | | |
|---|---|---|---|
| KR | 101827755 B1 | 2/2018 | |
| WO | 2021250510 A1 | 12/2021 | |

OTHER PUBLICATIONS

International Search Report mailed on Mar. 4, 2023, by the European Patent Office for International Application No. PCT/EP2023/052312, 5 Pages.
Written Opinion mailed on Mar. 4, 2022 by the European Patent Office for European Application No. PCT/EP2023/052312, 9 Pages.

* cited by examiner

Section F-F

Section G-G

COMBINED POSITION AND SENSOR SYSTEM

The present disclosure relates to a combined position and sensor system with a stator and rotor part, where the rotor part comprises one or more sensor components, and sensor data is transmitted from the rotor to the stator via inductive coupling. Additionally, a signal, which is dependent on the relative position of the stator and rotor part, is based on inductive coupling between inductive elements on the stator and one or more targets on the rotor.

BACKGROUND OF THE INVENTION

Control and/or supervision of moving parts such as in power-transmission engines, motor vehicle steering columns, e.g. in driverless vehicles, actuators, etc. may require real-time sensor measurements, which are impossible, or at least highly impractical, to obtain with a wired system.

Additionally, available space is in many cases a factor as there is often not much space for the components needed for the required sensor measurements.

For example, accurate and precise control of the electric motor on an electric bicycle requires real-time measurements of how hard the rider is pedalling so as to adjust the amount of electric power to push to the motor; Generally, the harder the rider pedals, the more power the motor should provide, and the softer the rider pedals, the less power the motor should provide. It may be advantageous, however, to make the amount of electric power pushed to the motor dependent on not just how hard the rider pedals, but also dependent on other factors, such as the angular position of the crank spindle.

Furthermore, a precise measurement of the angular position of a shaft such as the crank spindle allows for fast calculation of the angular velocity with very little movement of the crank, or can allow for precise shifting in an electronic gear box.

There is thus a need for a versatile combined position and sensor system with a small form factor.

It is an object to provide an improved combined position and sensor system.

It is a further object to provide a compact combined position and sensor system.

It is a further object to provide an electric vehicle, such as an electric bicycle, comprising the disclosed combined position and sensor system.

It is a further object to provide an improved method of regulating power provided by a motor control system for an electric vehicle comprising an electric motor.

SUMMARY OF THE INVENTION

In a first aspect is provided a combined position and sensor system, in a second aspect is provided an electric vehicle comprising the combined position and sensor system of the first aspect, and in a third aspect is provided a method of regulating power provided by a motor control system for an electric vehicle comprising an electric motor. In the aspects, the terms and features relate to the terms and features having the same name in other aspects and therefore the descriptions and explanations of terms and features given in one aspect apply to the other aspects.

In the first aspect, a combined position and sensor system is disclosed. The combined position and sensor system comprises: a stator part, which has a voltage source that is configured to generate an AC carrier signal, a stator inductor, and one or more receiver inductors. The combined position and sensor system further comprises: a rotor part, which has a rotor inductor, one or more sensor components configured to generate sensor data, and one or more targets. The rotor part and the stator part are rotatable in relation to each other in a contactless manner and configured such that the stator inductor and the rotor inductor are inductively coupled, whereby an AC current is induced in the rotor inductor. The rotor part is configured to generate a DC current from the induced AC current. The two parts, the stator part and the rotor part, are further configured to transmit the sensor data from the rotor part to the stator part via the inductive coupling between the stator inductor and the rotor inductor. The one or more receiver inductors are coupled to the stator inductor through the one or more targets on the rotor part, and the stator part is further configured to create a position-dependent signal based on the inductive coupling between the one or more receiver inductors and the stator inductor. The position-dependent signal has an amplitude, which is depending on the relative position of the one or more targets of the rotor.

The one or more sensor components may be configured to output a sensor signal based on a measurement and sensor data may be at times be represented by one or more sensor signals. Thus, a transfer of sensor data may be achieved by a transfer of a sensor signal.

Thus, the stator inductor induces an eddy current in the one or more targets, and that eddy current induces a current in the one or more receiver inductors. In this way the stator inductor is coupled to each of the one or more receiver inductors with a stator-receiver coupling coefficient specific to each coupling. Further, the stator inductor is coupled to the rotor inductor with a stator-rotor coupling coefficient, and this coupling is used to provide an AC current that is rectified in the rotor part to power the electrical components of the rotor part such that the rotor part does not require its own power supply. Lastly, the stator-rotor coupling is used to transfer sensor data from the rotor part to the stator part. Thus, the stator inductor is utilised for the transfer of power to the rotor part, for the coupling used in the creation of the position-dependent signal, and for data transfer. This allows for the combined position and sensor system to be made more versatile, compact and robust than previously known devices.

In a stator-rotor system, the stator part will usually remain stationary, while the rotor part will be able to move with a part of the structure, which the stator-rotor system is installed in/on. However, in some situations, where appropriate, the stator part and rotor part of the disclosed combined position and sensor system may be installed such that it is the disclosed rotor part, which remains stationary and the stator part, which moves with a part of the structure. In other situations, both rotor and stator can remain stationary relative to each other.

A target is made of a material, which allows eddy currents to circulate, i.e. a magnetically permeable and electrically conductive material, such as a metal and is configured to face away from the receiver inductor(s) (as seen from the stator part). A target may be a metal sheet.

In some embodiments, the rotor part may comprise a metal sheet acting as a target, such as a single target. In some embodiments, the rotor part may comprise a rotor element, such as a substrate, positioned in a fixed position with respect to the target, and the rotor inductor being positioned on the rotor element.

In some embodiments, the metal sheet has a layer of plastic that has been deposited or evaporated onto the metal sheet. In some embodiments, the target is a metal tape. In some embodiments the target is metal deposited on a plastic part.

The stator inductor, one or more receiver inductors and one or more targets are part of an integrated magnet-free, inductive position sensor utilising that a signal applied to the stator inductor is coupled through the target to the receiver inductor(s) via eddy currents in the target, which can be used to detect the position of the simple conductive target that moves in relation to the inductors. Based on the position of the one or more targets relative to the inductive elements on the stator part a position-dependent signal is created, where the signal has an amplitude that depends on the relative position. The relative position may be any displacement between the stator part and rotor part such as angle or distance. Thus, in some embodiments, the stator part is further configured to determine the position, or a derivative thereof, of the rotor part relative to the stator part based on the position-dependent signal.

The rotor part may comprise a plurality of targets or a single target. In some embodiments, the rotor part comprises a single target for determination of the position, or a derivative thereof, relative to the stator part. Thus, in some embodiments, the stator part is further configured to create the position-dependent signal based on the coupling between the one or more receiver inductors and the stator inductor through a single target. An advantage of having a single target is that it allows for a better utilization of the limited space available, for example, when the components of the rotor are placed on top of (behind as seen from the stator side) the target, a single target can allow for better utilization of the limited space available.

The stator part may comprise a plurality of receiver inductors or a single receiver inductor. In some embodiments, the stator part comprises a single receiver inductor. Thus, in some embodiments, the stator part is further configured to create the position-dependent signal based on coupling between the stator inductor and a single receiver inductor. Having a plurality of receiver inductors may provide redundancy or increased sensitivity to the functions of the receiver inductors. Advantages of having a single receiver inductor includes a reduction in size and complexity, and reduced cost of manufacture of the combined position and sensor system.

Depending on the configuration of the stator-rotor system, the position-dependent signal can be described using a variety of mathematical functions to calculate the relative position or derivative thereof.

In some embodiments, the position-dependent signal used in the determination of the position, or a derivative thereof, of the rotor part relative to the stator part can be described as a continuous periodic function, such as a piecewise linear periodic function, such as a triangle wave function.

In some embodiments, the stator inductor and one or more receiver inductor are implemented as conductive windings in or on a non-conductive substrate, and the distance between the stator inductor windings and the receiver inductor windings is configured to be a function of the position or angle. This means that the distance between the stator inductor and each of the receiver inductors is a function of the position or angle.

By making use of simpler functions, such as a tringle wave function, the calculations are simplified, which reduces power consumption. Additionally, some lower accuracy requirements eliminate the need for having more than one receiver inductor, which further reduces form factor, complexity, and power consumption.

In some embodiments, the one or more receiver inductors are placed at a position-dependent distance from the stator inductor that can be described as a piecewise linear continuous periodic function, such as a triangle wave function.

Known devices are often configured such that the position-dependent signal can be described using sine and/or cosine functions, but as they are more complex functions this requires more calculating power, which increases power consumption. Further, configuring the system for a position-dependent signal that is described using a sine and/or cosine function will often require the use of at least two receiver inductors. Thus, in some embodiments, the position-dependent signal used in the determination of the position, or a derivative thereof, of the rotor part relative to the stator part cannot be described as a sine or cosine function.

The combined position and sensor system may be configured to have a shaft as part of the rotor part or the rotor part may be coupled to a shaft. Thus, in some embodiments, the rotor part comprises, or is coupled to, a shaft. The shaft may be configured to be connected to a rotating or rotatable part of another device.

The sensor component may be any type of suitable sensor component. For example, the sensor component may be a strain gauge sensor, a piezoelectric sensor, a polymer film sensor, a Hall-effect sensor, etc.

In some embodiments, at least part of the sensor component is positioned on the shaft. The sensor component or the sensor component part may be fixed on the shaft, e.g. glued to the shaft.

In some embodiments, the sensor component is a torque sensor such as a rotary torque sensor or static torque sensor. In some embodiments, the sensor component is a strain gauge sensor such as a strain gauge sensor that is part of a torque sensor (or part of another type of sensor). Part of the strain gauge sensor may be fixed to the shaft or to another appropriate part of the rotor part. The strain-sensing element of the strain gauge sensor may be positioned on the shaft.

In some embodiments, the rotor part comprises, or is coupled to, a second rotor disc, and at least part of the sensor component is positioned on the second rotor disc. The strain-sensing element of the strain gauge sensor may be positioned on the second rotor disc.

The rotor part and the stator part are rotatable in relation to each other in a contactless manner. In some embodiments, the stator part and the rotor part are separated by an air gap, the air gap separation being between 0.1 mm-5.0 mm, such as between 0.4 mm-1.8 mm, such as between 0.5 mm-1.6 mm.

The stator part and/or rotor part may be shaped as discs, such as substantially elliptical discs. The inductive elements of the stator part and/or of the rotor part may be conductive windings laminated on or embedded in a substrate. For example, the inductive elements of the stator part and/or of the rotor part may be at least partly or fully embedded in a multilayer substrate. The inductive elements of the stator part and/or of the rotor part may be fully embedded in a multilayer substrate, i.e. be comprised in one or more substrate layers, which are not the top or bottom layer of the multilayer substrate. In some embodiments, the stator inductor is shaped as an ellipse having an axis diameter that is between 5 mm-110 mm, such as between 8 mm-80 mm, such as between 10-40 mm.

In some embodiments, the rotor part and/or the stator may be shaped to allow for easier mounting of the combined position and sensor system. For example, the rotor part and/or the stator part may comprise a cut-out, such as a cut-out in a substantially elliptical disc, such that the rotor/ stator part is C-shaped. In some embodiments of a C-shaped rotor part B, all the rotor electronics and target are comprised on a C-shaped substrate.

In particular, the relative stationary part may have a variety of shapes to suit the mechanism in which the combined position and sensor system is installed, and the stationary part in particular may be shaped for ease of mounting, such as comprise a cut-out that allows it to slide into a position relative to the moving part of the combined position and sensor system.

The combined position and sensor system may comprise one or more processing units, or may be configured to transmit data signals, such as signals indicative of sensor data and relative position for receipt by one or more processing units. A processing unit may be configured to receive data signals and to process received sensor data to extract information therefrom.

The combined position and sensor system disclosed herein may be configured to calculate a measure of adjusted sensor data, where the calculation comprises adjusting the acquired sensor data, the adjustment being dependent on position data derived from the position-dependent signal such that the measure of adjusted sensor data is a function of the position data. Alternatively, the combined position and sensor system disclosed herein may be part of a system that is configured to calculate a measure of adjusted sensor data. The measure of adjusted sensor data may be calculated by one or more processing units. Some or all of the processing steps may be performed by a local processing unit localised within the combined position and sensor system, or some or all of the processing steps may be performed by a data processing unit external to the combined position and sensor system, or the processing steps may be distributed between a local processing unit and an external processing unit.

Here and in the following, the term processing unit is intended to comprise any circuit and/or device suitably adapted to perform the functions described herein. In particular, the term processing unit comprises a general- or special-purpose programmable microprocessor unit, such as a central processing unit (CPU) of a computer or of another data processing system, a digital signal processing unit (DSP), an application specific integrated circuits (ASIC), a programmable logic arrays (PLA), a field programmable gate array (FPGA), a special purpose electronic circuit, etc., or a combination thereof.

The combined position and sensor system may be part of a control system such as a motor control system. The control system may be configured to control a component in response to receiving one or more signals based at least in part on data from the combined position and sensor system. For example, the control system may control a motor supplying power, where the amount of power supplied may be based at least in part on received position and sensor data, and/or on a measure of adjusted sensor data. In some embodiments, the combined position and sensor system, or the control system, may be configured to calculate a measure of adjusted sensor data, such as a measure of adjusted torque, where the acquired sensor data are adjusted based on the measured position data. For example, if the sensor is a torque sensor, the measure of adjusted torque is an angular position dependent torque measure. Such a measure of adjusted torque may advantageously be used by a motor control system to regulate the power supplied. Thus, the power supplied by such a motor control system may be non-linearly dependent on the measure torque.

In the second aspect, an electric vehicle is disclosed, where the electric vehicle comprises the combined position and sensor system of the first aspect.

In some embodiments, the electric vehicle is an electric bicycle.

In some embodiments, the one or more sensor components comprises a torque sensor.

In some embodiments, the one or more sensor components is fitted to the motor control system of the electric vehicle, such as to the motor control system of an electric bicycle.

The rotor part of the combined position and sensor system may be coupled to a crank spindle and the stator part to a stationary part of a bottom bracket to provide a measurement of the angular position of the crank spindle in relation to the bottom bracket. Thus, the position-dependent signal may be used to determine the angular position of a crank spindle. A measurement of the angular position using the improved combined position and sensor system disclosed herein has a high precision allowing for a calculation of the angular velocity even with little movement of a crank attached to the crank spindle. Further, a torque sensor on the rotor part B may be configured to measure the torque on the crank spindle.

The electric vehicle may comprise a motor control system, where the motor control system may be configured to regulate the power provided to an electric motor of the electric vehicle. The motor control system may be configured to regulate the power in accordance with the method of the third aspect.

In the third aspect, a method of regulating power provided by a motor control system for an electric vehicle comprising an electric motor is provided. The electric vehicle further comprises a combined position and sensor system, a rotor part of the combined position and sensor system is coupled to a rotatable shaft, such as a crank spindle, and a stator part is coupled to a stationary part, such as a stationary part of a bottom bracket. The combined position and sensor system is further configured to measure a torque applied to the rotatable shaft or to an element coupled to the rotatable shaft, and to provide a position-dependent signal indicative of the angular position of the rotor part relative to the stator part, and the method comprises:

receiving, by a processing unit, the position-dependent signal and a signal indicative of the measured torque, calculating, by a processing unit, a measure of adjusted torque, the calculation comprising adjusting the measured torque as a function of the position-dependent signal, and controlling the power pushed to the electric motor based on the measure of adjusted torque.

In some embodiments, the combined position and sensor system is a combined position and sensor system as disclosed herein.

BRIEF DESCRIPTION OF THE DRAWINGS

In the following, exemplary embodiments of the invention are described in more detail with reference to the appended drawings, wherein.

DETAILED DESCRIPTION

Figure 1:
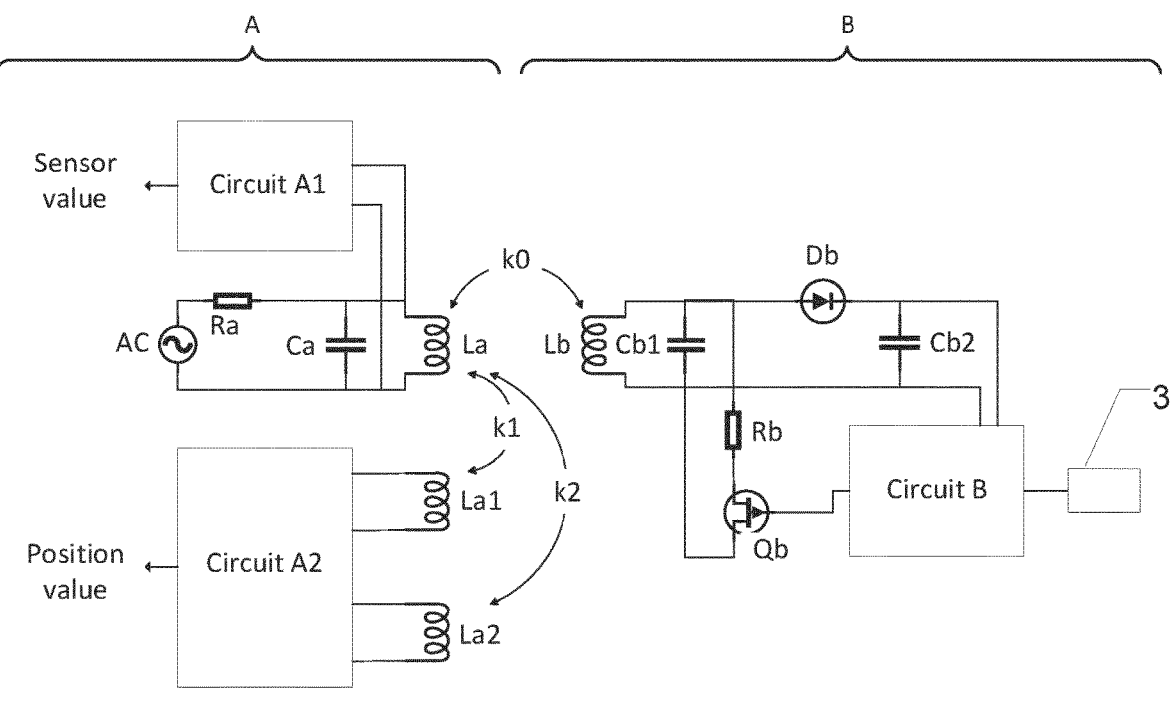
FIG. 1 shows a circuit diagram of the combined position and sensor system according to some embodiments.

In the following, various exemplary embodiments of the disclosed combined position and sensor system is described with reference to the appended drawings. The skilled person will understand that the accompanying drawings are schematic and simplified for clarity and therefore merely show details which are essential to the understanding of the invention, while other details have been left out. The elements shown in the drawings are not necessarily drawn to scale, but may primarily be illustrative of relative position, orientation, and function. Like reference numerals refer to like elements throughout. Like elements will therefore not necessarily be described in detail with respect to each figure.

FIG. 1 shows a circuit diagram of the combined position and sensor system according to some embodiments. On the left side of the figure is shown elements, which are part of a stator part A, and on the right side is shown elements, which are part of a rotor part B. The stator part A and rotor part B are arranged to be rotatable in relation to each other in a contactless manner.

Stator part A has an AC voltage source, and supplies power to rotor part B using inductive coupling between a stator inductor La, which couples to a rotor inductor Lb on the rotor part B with coupling coefficient k0. A rectifier on rotor part B (diode Db and capacitor Cb2) generates a DC voltage, which powers the electrical components on rotor part B.

Optionally, a stator capacitor Ca and a rotor capacitor Cb1 may be coupled in parallel or series with the stator inductor La and rotor inductor Lb, respectively, to create resonant circuits.

Circuit B on the rotor part B receives a sensor signal from a sensor component 3, which is configured to measure a sensor data parameter and produce a sensor signal. The sensor component 3 could be e.g. a strain gauge affected by a torque. After receiving the sensor signal circuit B converts it to a digital data stream, which drives a transistor Qb that in turn produces a load modulation via a resistor Rb. The load modulation can be picked up by a circuit, Circuit A1, on the rotor part A via the inductive coupling between the stator inductor La and the rotor inductor Lb. Circuit A1 then produces a sensor value based on the measurement made by the sensor component 3 and outputs it.

The stator part A has two receiver inductors La1, La2, which couple to the stator inductor La via one or more targets on rotor part B (not shown) with coupling constants k1 and k2. The receiver inductors La1, La2 are configured such that the coupling to the stator inductor La varies as a function of the relative position P of rotor part B to stator part A, i.e. k1=f1(P) and k2=f2(P). For example, the distance between La and each of the receiver inductors may vary as a function of the relative position P, such as the relative angular position. In this way, the position/angle of rotor part B relative to stator part A can be determined using the coupling constants k1 and k2. When the rotor part B is moved relative to the stator part A the coupling constants k1, k2 between the stator inductor La and the two receiver inductors La1, La2 change due to the movement of the one or more targets on the rotor part B as the targets are positioned such that they move relative to and past the stator inductor La and the two receiver inductors La1, La2. In a known manner, the electrical voltages across the receiver inductors can be measured creating a position-dependent signal the amplitude of which depends on the relative position of the one or more targets.

In the embodiment shown, where the rotor part A has two receiver inductors La1, La2, the relative position P may be determined by the Circuit A2 by comparing the coupled signals from La1 and La2 to the known functions f1(P) and f2(p). In other embodiments, the rotor part A may have only a single receiver inductor, which requires more processing by Circuit A2, but has as an advantage that the combined position and sensor system can be made even more compact.

Figure 2:
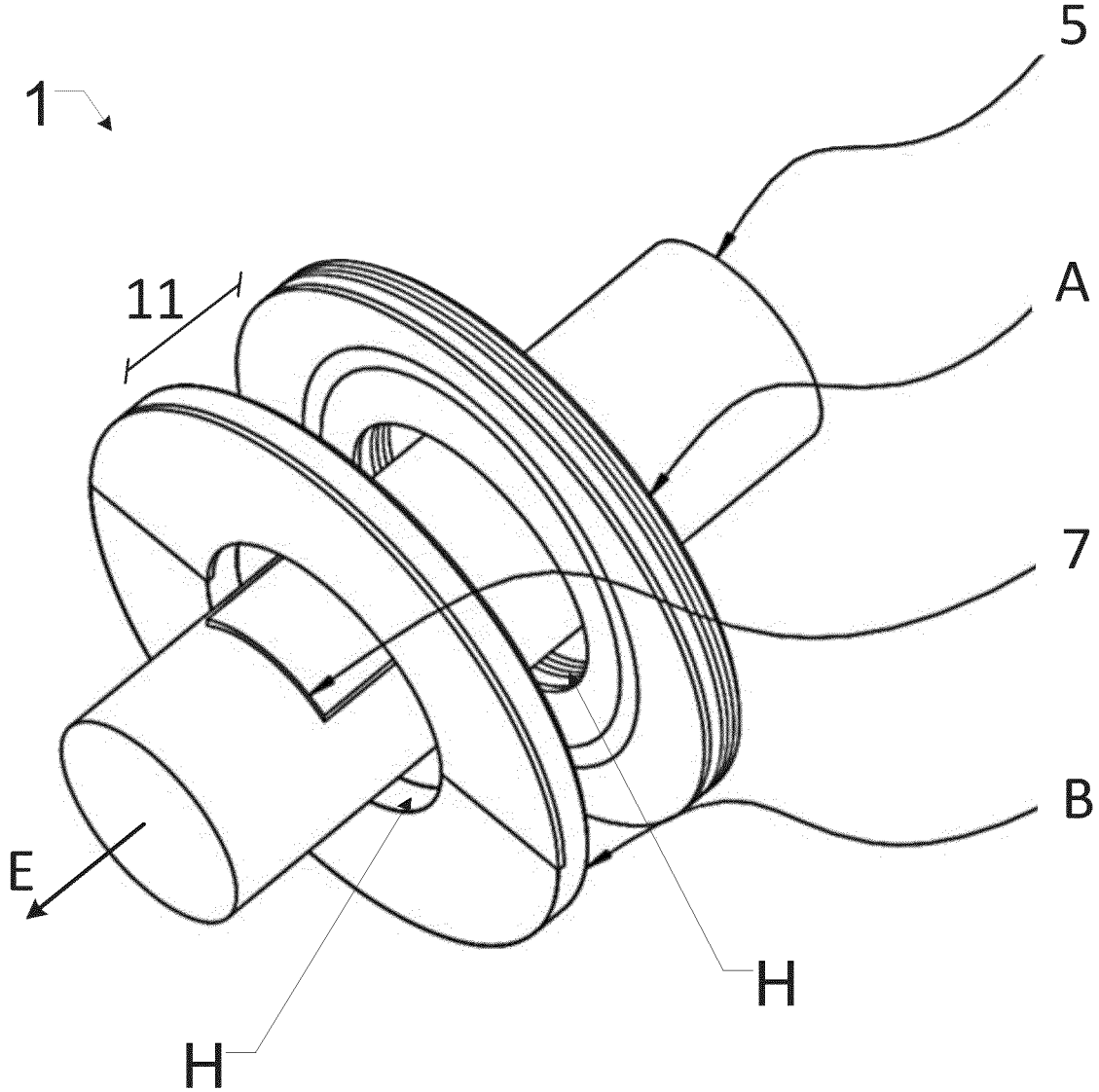
FIG. 2 shows an illustration of a combined position and sensor system according to some embodiments.

FIG. 2 shows an illustration of a combined position and sensor system 1 according to some embodiments. The combined position and sensor system 1 has a stator part A, which are shaped as a circular disc with a central hole H. The system 1 further has a rotor part B, which comprises a circular disc with a central hole H and a shaft 5. The outer shape of the rotor and stator need not be the same or similar. For example, the outer shape of the rotor part may be substantially circular, while the outer shape of the stator part has another shape, i.e. a shape that is not substantially circular. The stator part may be shaped for attachment, e.g. have an irregular shape with an attachment part having a through-hole so that it may be screwed in place. The circular discs of stator part A and rotor part B are arranged substantially parallel and are positioned in a contactless configuration with an airgap 11 between them. The stator part A and rotor part B are rotatable in relation to each other and the system 1 is configured such that a stator inductor on stator part A can inductively couple to a rotor inductor on rotor part B.

The circular disc of rotor part B is fixed to the shaft 5, which is rotatable, such that the circular disc of rotor part B rotates with the shaft, while the stator part A is configured to remain stationary. The shaft 5 extends through the central hole H in the circular discs of the stator part A and rotor part B with its centreline E passing through the centres of the circular discs.

The rotor part B has a strain gauge sensor component, i.e. a strain sensor, where a part of the strain gauge, a strain gauge part 7, is positioned on the shaft 5. Being positioned thusly means that the strain gauge part 7 moves in rotation with the rotating shaft 5 allowing for it to measure the torque on the rotating shaft 5. The sensor measurements are transferred from the rotor part B to stator part A through the coupling between the rotor inductor and stator inductor, for example through a circuitry such as that shown in FIG. 1.

In the embodiment shown in FIG. 2, the shaft 5 could be an output shaft, such as an output shaft of an electric motor, but can in reality be used in any setup, where it is advantageous to measure both the torque on a rotating shaft and angular position of the rotating shaft. Measuring both the torque on a rotating shaft and its angular position can advantageously be utilised in various setups. For example, the angular position of the rotating shaft may be used to calculate an adjustment to the power provided by a motor control system as described below.

The stator part A and rotor part B have a number of elements, which are not shown in FIG. 2: the stator part A has a stator inductor La, and at least one receiver inductors La1 and the rotor part B has a rotor inductor Lb and at least one target.

Additionally, the stator part A and the rotor part B may comprise elements of the diagram shown in FIG. 1. The rotor and stator electronic elements may each be mounted or printed on one or more PCBs and when referring to the electronics herein it is given that they are adhered to a suitable surface. When mounting the combined position and sensor system for use, e.g. as part of an electric bicycle, the PCBs, or other surface comprising the electronics, will each be attached to, or coupled to, one or more mechanically rigid elements. In some configurations, some or all of the rotor electronics may be positioned on the disc and/or on the shaft 5, such as on the strain gauge part 7. For example, the rotor electronics, except for the inductive elements, may be comprised in a module positioned on the strain gauge part 7. The module may comprise a plastic covering, which shields the rotor electronics and Al foil may be positioned under the strain gauge part 7 to provide a configuration that eases installation. In the case of the stator part A, which is attached and fixed in place, some or all of the stator electronics, except for the inductive elements and wiring, may be positioned on a separate element to that on which the inductive elements are positioned.

A receiver inductor La1 couples to the stator inductor La via the at least one target on rotor part B with coupling constant k1. The receiver inductor La1 is configured such that the coupling to the stator inductor La varies as a function of the angular position of rotor part B relative to stator part A due to the movement of the target(s) when the shaft 5 rotates. This movement of the target(s) causes the coupling constant k1 to change because the target(s) on the rotor part B moves relative to the stator inductor La and the receiver inductor La1 as the shaft 5 rotates. In a known manner, the electrical voltage across the receiver inductor can be measured to create a position-dependent signal the amplitude of which depends on the relative position of the target(s).

The embodiment shown in FIG. 2 is one of several possible configurations of the combined position and sensor system 1. In some embodiments the stator part A may have an element shaped as a disc, and in some embodiments the rotor part B may have a shape other than the shown disc fixed to a shaft. For example, the rotor part B may in some embodiments substantially be comprised of a wire and electronics. In some embodiments, the stator part A and/or the rotor part B may be C-shaped, i.e. shaped as a disc with a central hole H and a cut-out, see FIG. 3.

For use in a motor control system, such as a motor control system for an electric bicycle, the rotating shaft, to which rotor part B is coupled, may be part of a crank spindle and the stator part A may be coupled to a stationary part of a bottom bracket. A torque sensor measures the torque on the rotating shaft and the angular position of rotor part B relative to stator part A can be determined as discussed above. From this, both the force applied by a rider to a pedal coupled to a crank that is again coupled to the crank spindle as well as the angular position of the crank can be determined. However, the force applied by a bicycle rider is usually primarily oriented downwards. This means that the force that a rider can apply to a pedal is dependent on the position of the crank as anyone who has tried to start pedalling when the right and left crank were vertical, or close to vertical, has experienced. This in turn means that the torque measured on the rotating shaft does not directly reflect the intention of the rider. Therefore, advantageously, a measure of adjusted torque may be calculated by taking into account the relative angular position. A motor control system may then use the measure of adjusted torque to regulate the power pushed to an electric motor, where the power pushed is not linearly dependent on the measured torque. Calculating the measure of adjusted torque thus provides an angular position dependent torque measure, which can compensate for the biomechanical difference in how much force a rider can apply depending on the angle of the crank.

The measure of adjusted torque is not limited in use to electric bicycles, but may be useful in any setup in which the torque applied to the rotating shaft has a dependence on the angular position of the rotor part B relative to the stator part A.

A further advantage of using a measure of adjusted torque may be a higher accuracy of torque measurements made by a strain gauge as any angular variation of the measured torque may be corrected for. For example, a strain gauge is susceptible to angle-dependent measurement errors resulting from e.g. imperfections in the surface on which it is mounted, less-than-ideal mounting of the strain gauge, and/or forces that impact the signal from the strain gauge. Such measurement errors can often be corrected for to some degree by using one or more additional strain gauges. Thus, using an adjusted torque further allows for the use of fewer strain gauges.

Figure 3:
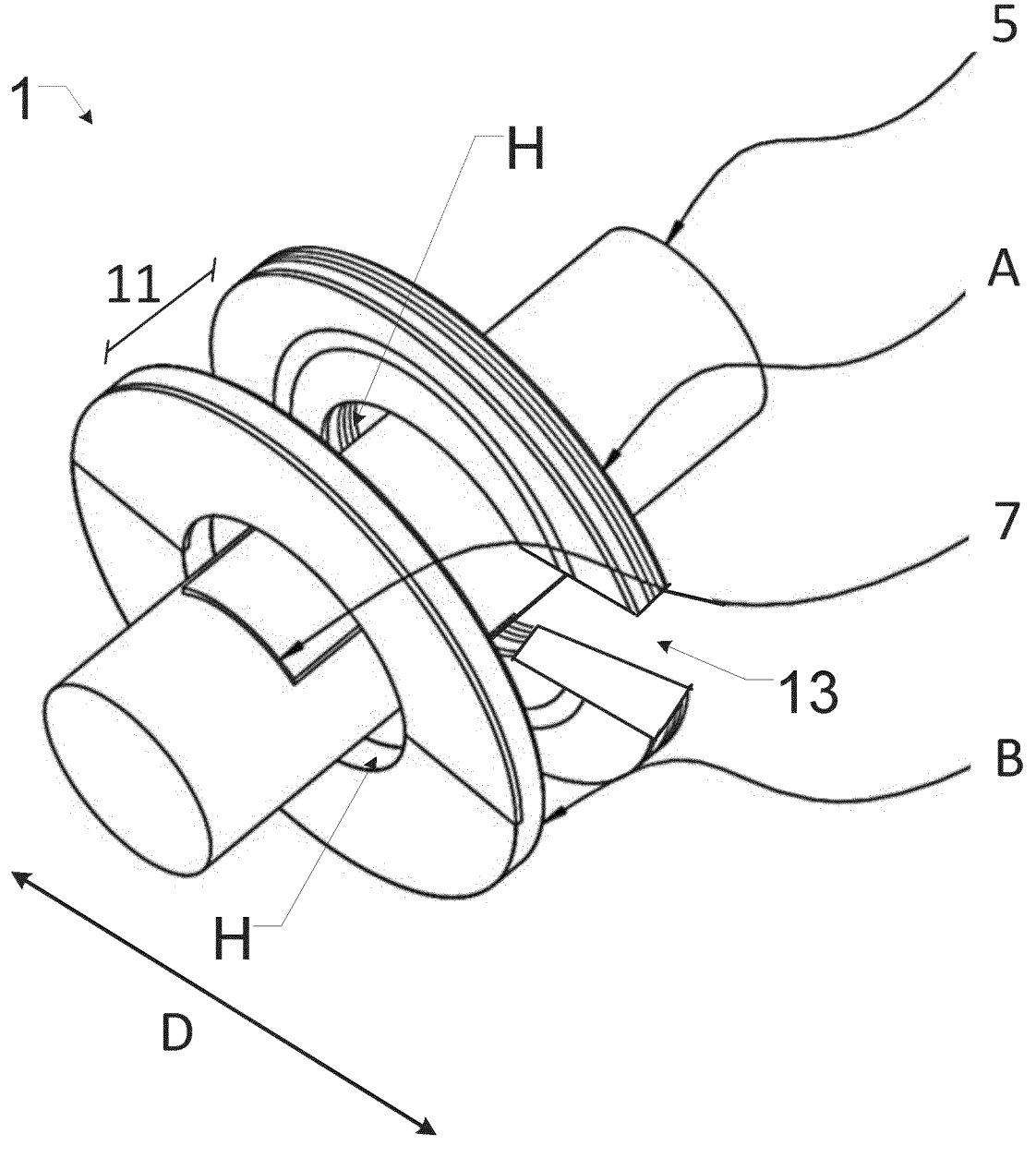
FIG. 3 shows an illustration of a combined position and sensor system according to some embodiments.

FIG. 3 shows an illustration of a combined position and sensor system 1 according to some embodiments. The combined position and sensor system 1 may be similar to that shown in FIG. 2, but with the stator part A having a cut-out 13 in its circular disc and thereby being C-shaped. Such a configuration has the advantage that it allows for easier mounting of the combined position and sensor system 1.

In the embodiment shown in FIG. 3, the cut-out 13 is dimensioned such that the stator part A can be mounted with respect to the rotor part B by having the shaft 5 passing through the cut-out 13, and thereby sliding either the rotor or the stator into position "sideways" substantially along the direction D.

Figure 4:
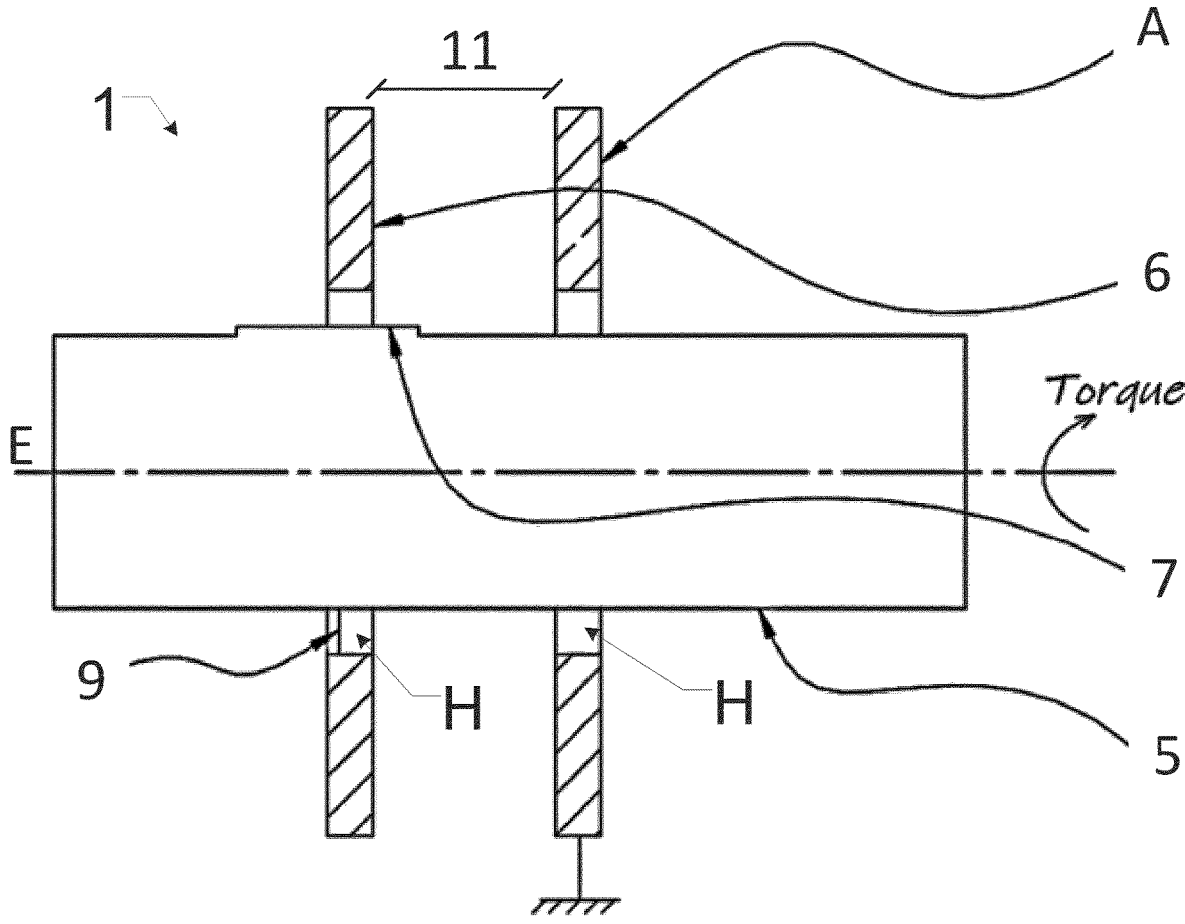
FIG. 4 shows a cut-away illustration of a combined position and sensor system according to some embodiments.

FIG. 4 shows a cut-away illustration of a combined position and sensor system according to some embodiments. The combined position and sensor system 1 may be similar to those shown in FIG. 2 or 3 seen from a direction orthogonal to the centreline E of the shaft 5.

The combined position and sensor system 1 has a stator part A, which is shaped as a disc that may be circular and which has a central hole H. The system 1 further has a rotor part B, which comprises a shaft 5, and a disc that may be circular and which has a central hole H. The discs of stator part A and rotor part B are arranged substantially parallel and are positioned in a contactless configuration with an airgap 11 between them. The stator part A and rotor part B are rotatable in relation to each other and the system 1 is configured such that a stator inductor on stator part A can inductively couple to a rotor inductor on rotor part B. A rigid link 9 spanning the gap between the disc of the rotor part B and the shaft 5 fixes the disc of rotor part B to the shaft.

Through the coupling between the stator inductor and at least one receiver inductor on the stator part A via at least one target on the rotor part B, the relative position of the rotor part B can be calculated. Additionally, measurements performed by a sensor component on the rotor part B can be transferred to stator part A via the coupling between the stator inductor and the rotor inductor. For example, the sensor component on the rotor part B may be part of a strain gauge to measure the torque on the shaft 5, when it rotates.

Figure 5:
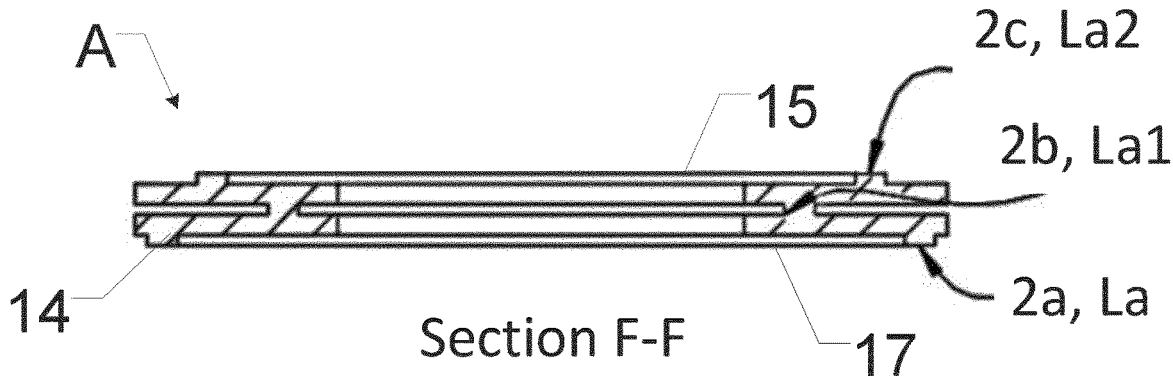
FIG. 5 shows an illustration of a stator part in a combined position and sensor system according to some embodiments, and a cut-away illustration of the same or a similar stator part.
Figure 5:
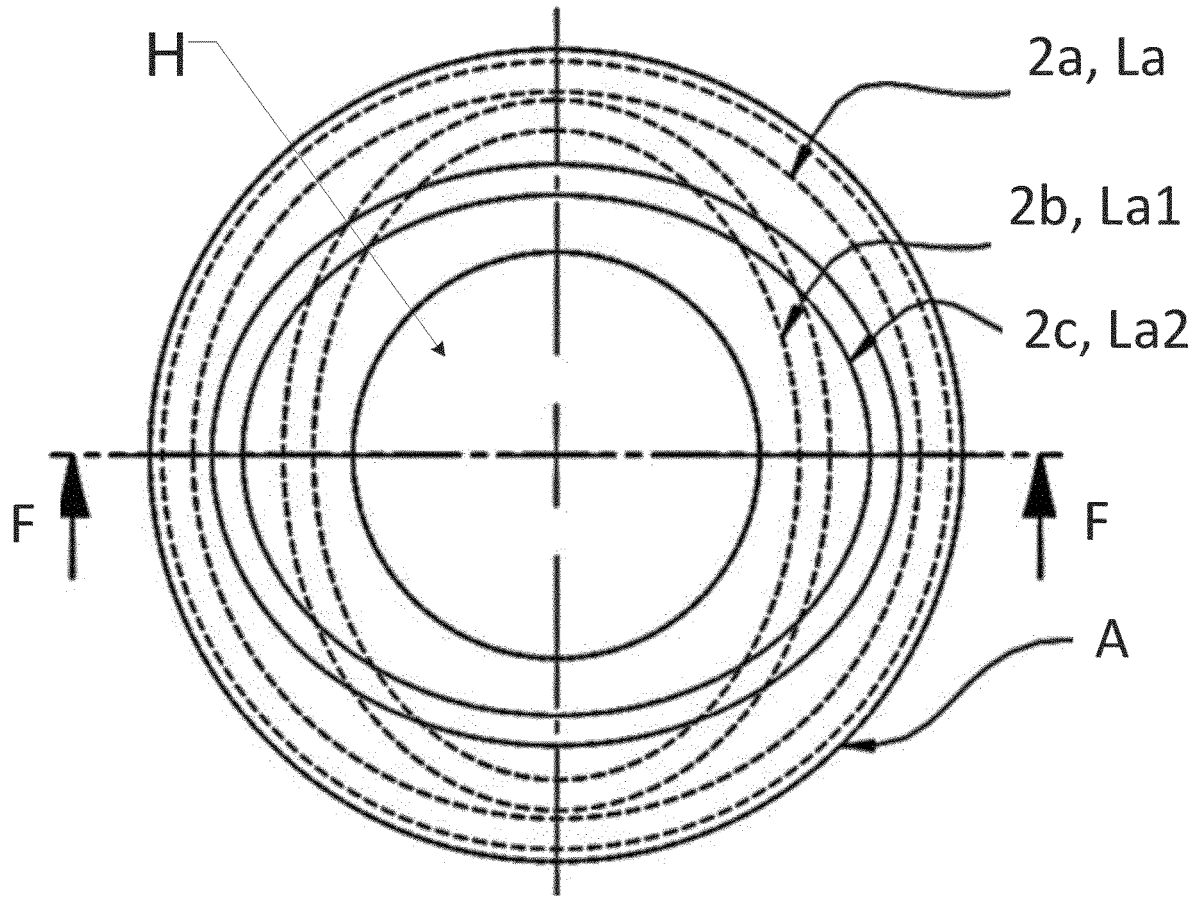

FIG. 5 shows an illustration of a stator part A in a combined position and sensor system 1 according to some embodiments, and a cut-away illustration along the cross-section line F-F of the same or a similar stator part according to some embodiments.

Stator part A is shaped as a circular disc with a central hole H. The stator part A comprises a unitarily formed multilayer board 14 with conductive windings, such as copper windings, laminated onto and/or between sheet layers of a non-conductive substrate. By unitarily formed is meant that the multilayer board 14 is manufactured so as to constitute a unit. That is, it may be constructed from individual parts, but after manufacture the individual parts form a new whole, which cannot be disassembled into the individual parts from which it was constructed. The stator multilayer board 14 has a first surface 15 and a second surface 17.

A stator inductor La is made with a circular copper winding 2a (dashed line) laminated on the second surface 17 of the stator multilayer board 14, a first receiver inductor La1 is made with an elliptical copper winding 2b (dashed line) embedded within the stator multilayer board 14, and a second receiver inductor La2, 2c is made with another elliptical copper winding 2c (solid line) printed on the first surface 15 of the stator multilayer board. Thus, the inductive elements are placed in separate layers of the multilayer board 14, which allows for miniaturisation of the stator part. The stator multilayer board 14 may comprise additional layers without inductive elements, and as an alternative to having all the inductive elements in separate layers one or more of the inductors may span more than one layer, e.g. by the use of vias.

Figure 6:
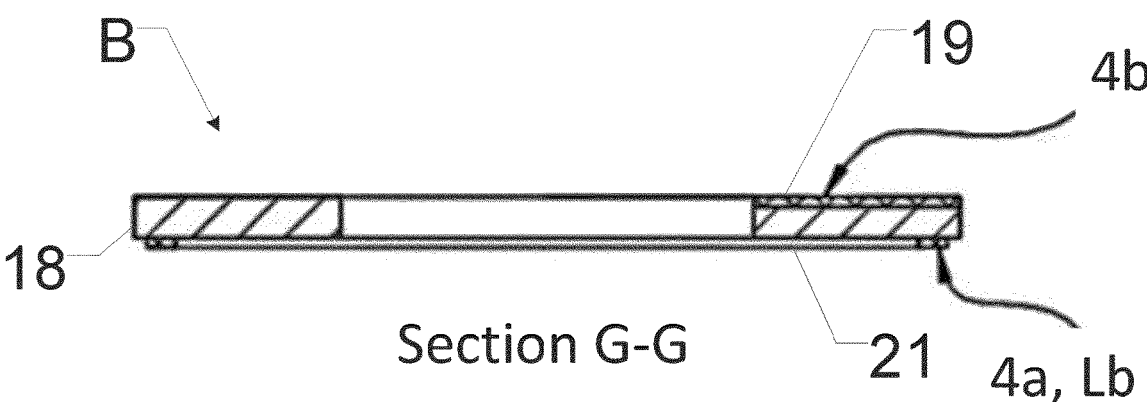
FIG. 6 shows an illustration of a rotor part in a combined position and sensor system according to some embodiments, and a cut-away illustration of the same or a similar rotor part.
Figure 6:
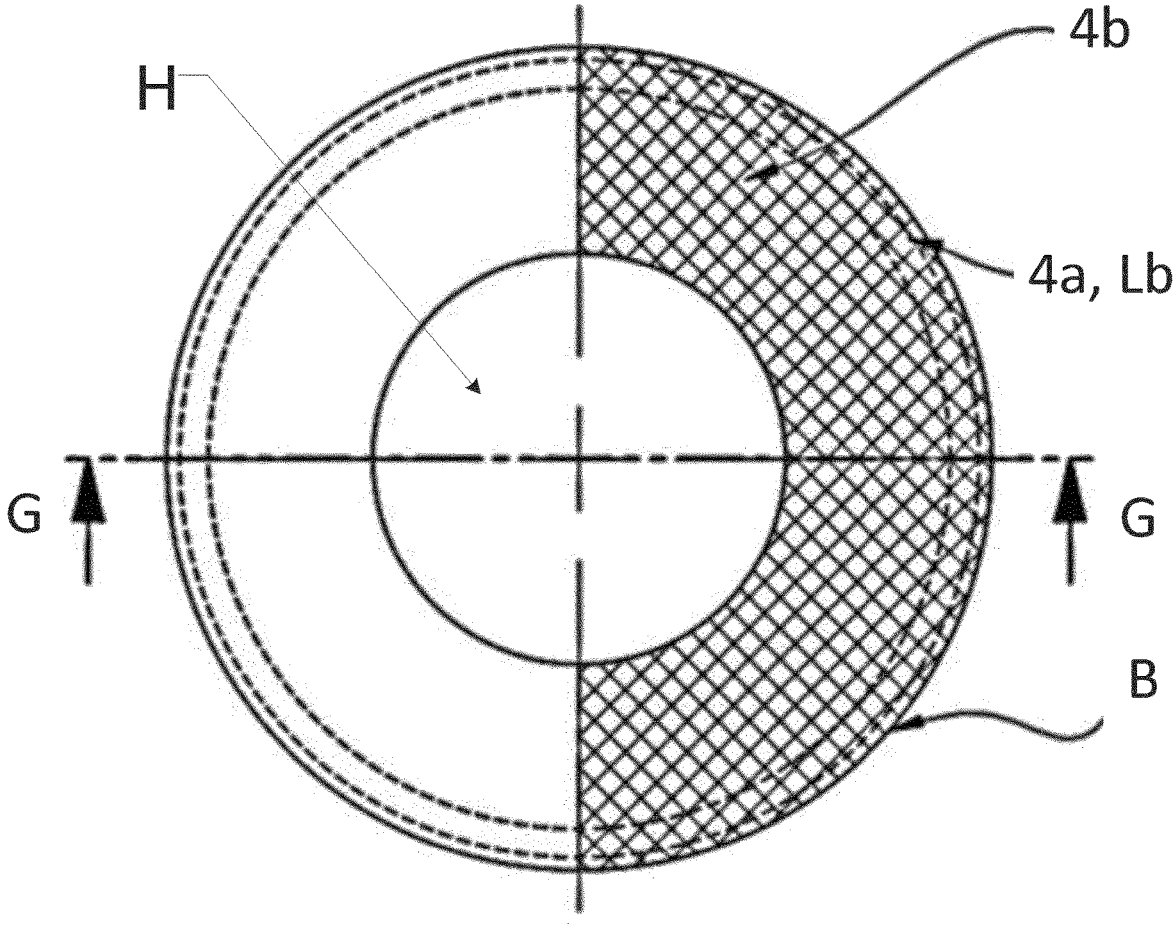

FIG. 6 shows an illustration of a rotor part in a combined position and sensor system 1 according to some embodiments, and a cut-away illustration along the cross-section line G-G of the same or a similar rotor part according to some embodiments.

Rotor part B comprises a circular disc with a central hole H, and a unitarily formed board 18 with conductive windings, such as copper windings, and a copper area laminated onto a non-conductive substrate. By unitarily formed is meant that the board 18 is manufactured so as to constitute a unit. That is, it may be constructed from individual parts, but after manufacture the individual parts form a new whole, which cannot be disassembled into the individual parts from which it was constructed. The rotor board 18 has a first surface 19 and a second surface 21.

A rotor inductor Lb is made with a circular copper winding 4a (dashed line) laminated on the second surface 21 of the rotor board 16, and a single target is made as a copper area 4b, which covers substantially half of the first surface 19 of the board 18. The rotor inductor Lb may span both surfaces of the single layer board shown in FIG. 6, e.g. by making us of vias between the surfaces.

The rotor board 18 may comprise additional layers, i.e. be a multilayer board, and as an alternative to having the rotor inductor copper windings 4a laminated on a single surface the windings may span more than one layer.

Figure 7:
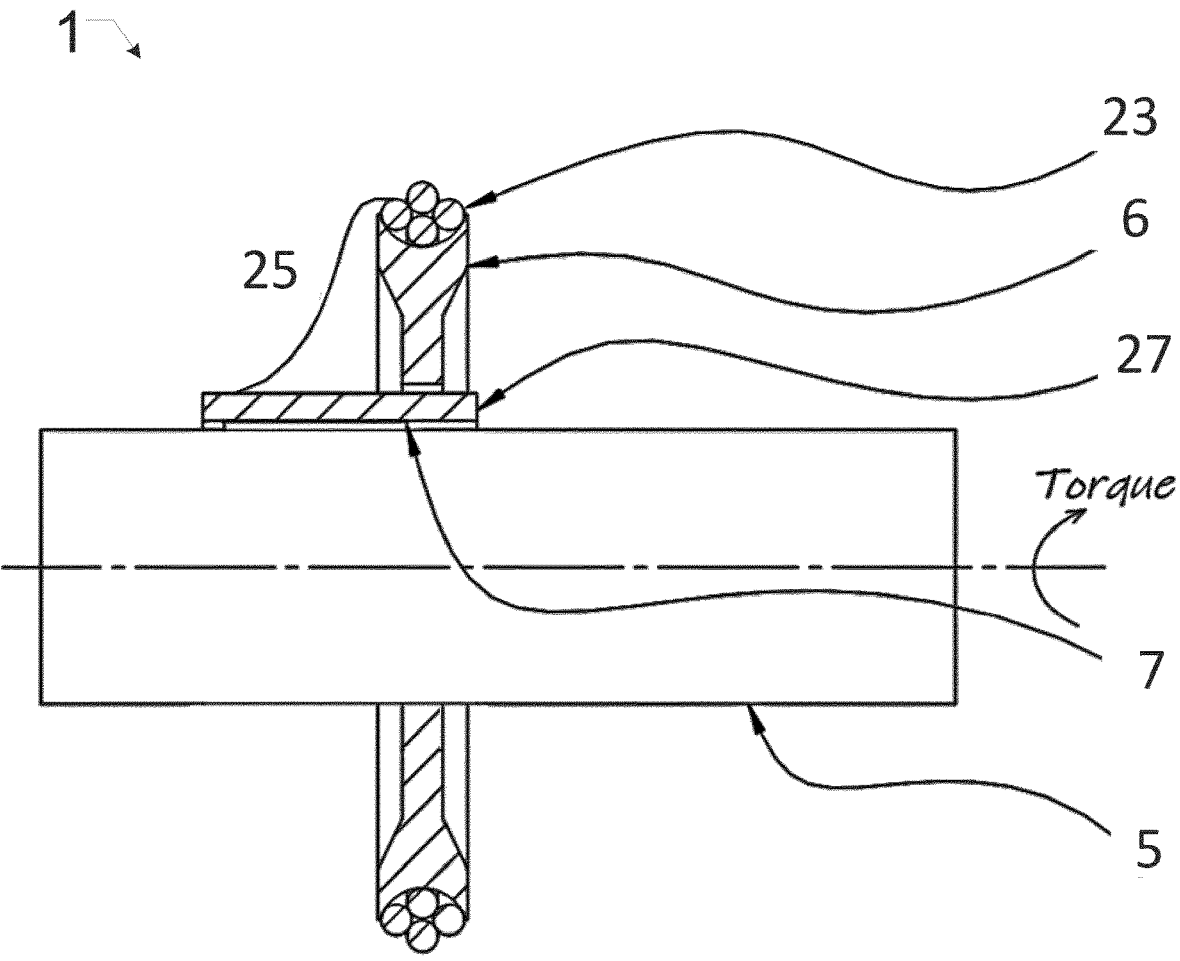
FIG. 7 shows an illustration of a rotor part in a combined position and sensor system 1 according to some embodiments.

FIG. 7 shows an illustration of a rotor part B in a combined position and sensor system 1 according to some embodiments. Target(s) and stator are not shown in the illustration.

The rotor part B comprises a disc 6, e.g. a circular disc, with one or more conductive windings 23, such as copper windings wound thereon thus providing a rotor inductor Lb. The ends of the one or more conductive windings 23 connect via e.g. wire 25 to electronics 27 placed parallel to the strain gauge part 7, i.e. to the strain sensing element on the rotor shaft 5. The strain sensing element 7 may be attached directly on the shaft 5 or to a component that is attached or coupled to the shaft 5. For example, a thin sheet (such as less than 1 mm thick) and optionally made of a metal such as Al may be attached, e.g. glued, between the shaft 5 and the strain sensing element 7.

Figure 8:
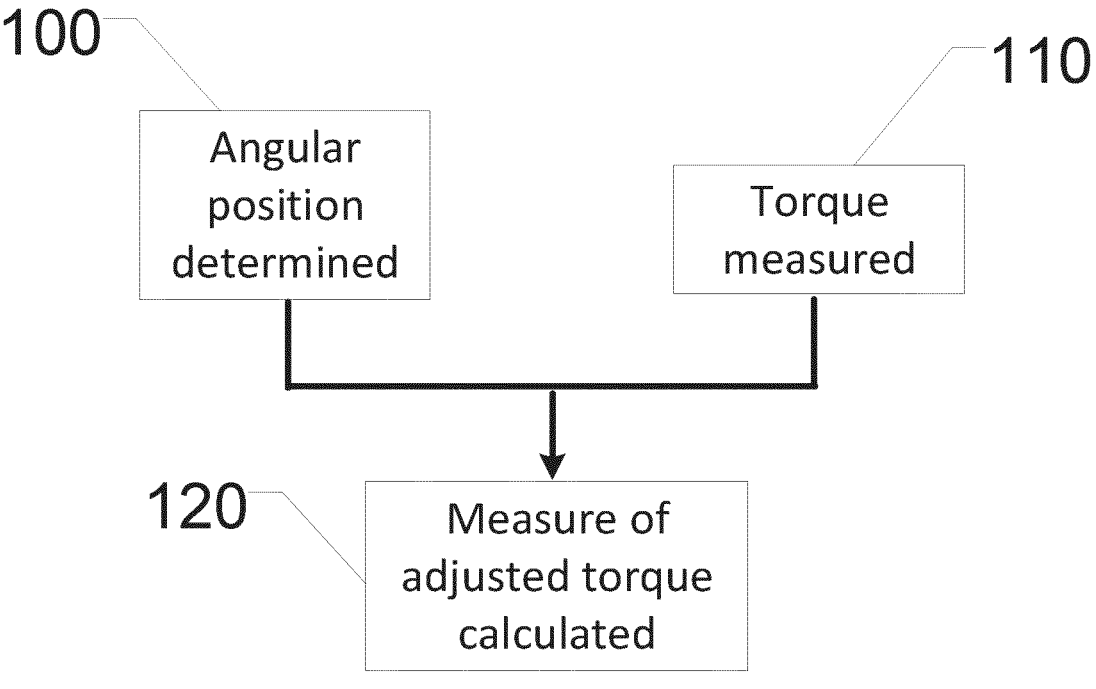
FIG. 8 shows a flow diagram of a method of regulating power provided by a motor control system for an electric vehicle comprising an electric motor.

FIG. 8 shows a flow diagram of a method of regulating power provided by a motor control system for an electric vehicle comprising an electric motor. The electric vehicle further comprises a combined position and sensor system, a rotor part of the combined position and sensor system is coupled to a rotatable shaft, such as a crank spindle, and a stator part is coupled to a stationary part, such as a stationary part of a bottom bracket. The combined position and sensor system is further configured to measure a torque applied to the rotatable shaft and to provide a position-dependent signal indicative of the angular position of the rotor part relative to the stator part.

In step 100, a processing unit receives the position-dependent signal and a signal indicative of the measured torque.

In step 110, a processing unit calculates a measure of adjusted torque, where the calculation comprises adjusting the measured torque as a function of the position-dependent signal.

In step 120, the power pushed to the electric motor is controlled based on the measure of adjusted torque. That is, the power is regulated as a function of the measure of adjusted torque.

Figure 9A:
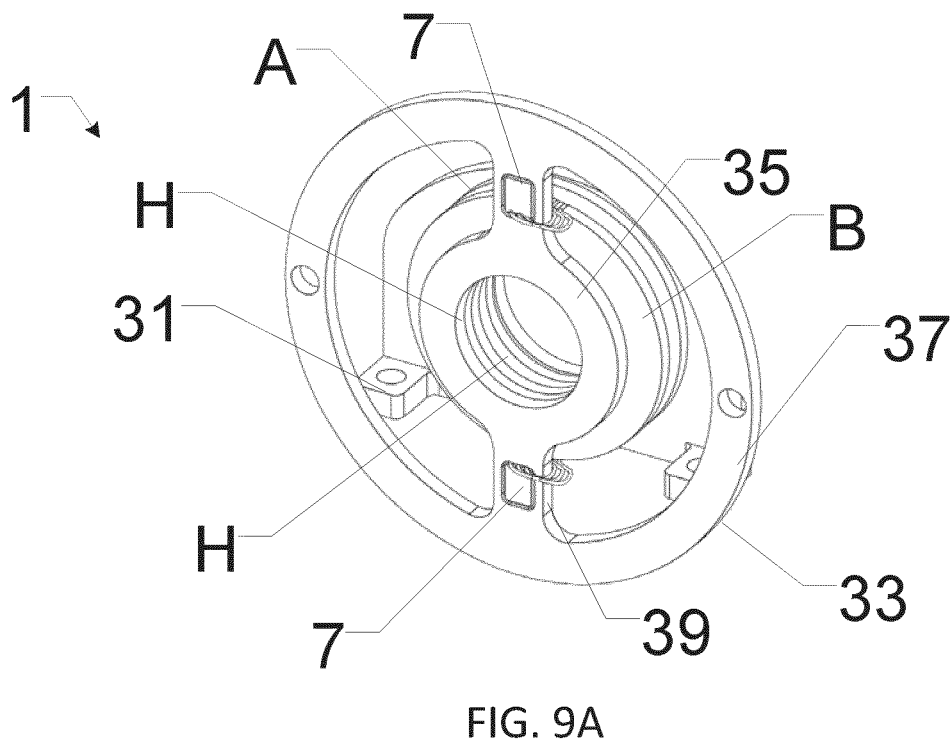
FIGS. 9A and 9B show illustrations of a combined position and sensor system according to some embodiments.
Figure 9B:
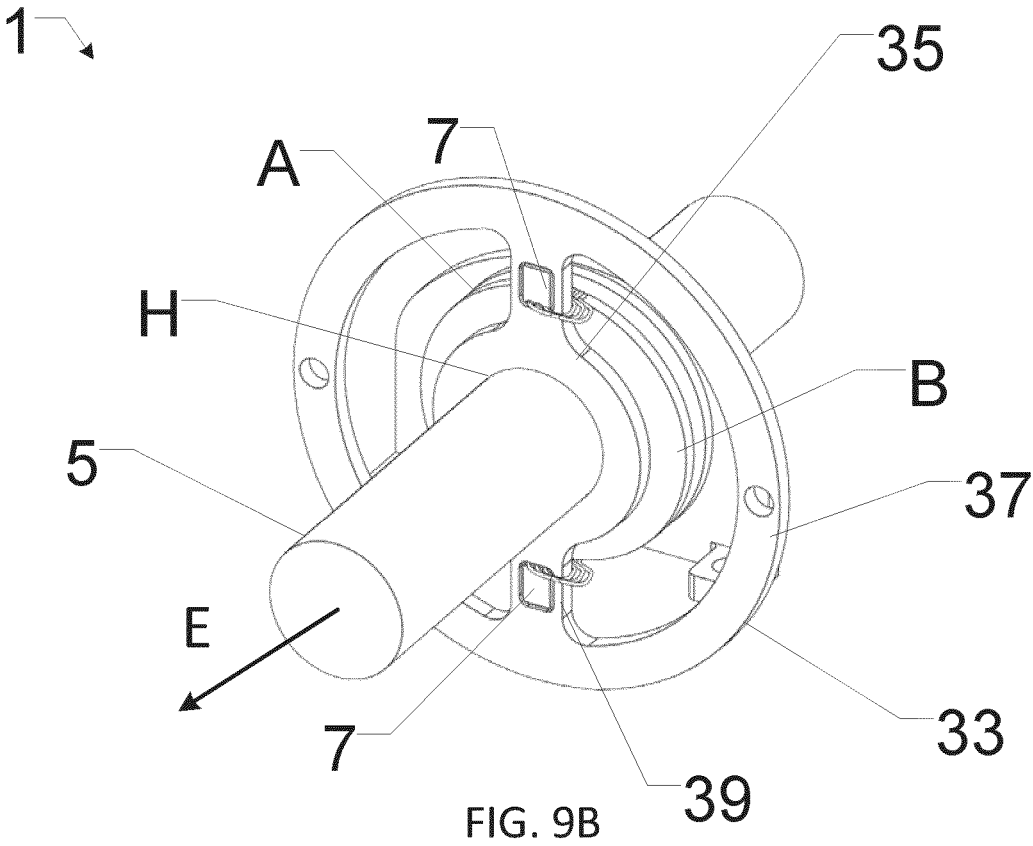

FIGS. 9A and 9B show an illustration of a combined position and sensor system 1 according to some embodiments. The combined position and sensor system 1 has a stator part A, which is shaped as a circular disc with a central hole H. The system 1 further has a rotor part B, which comprises a circular disc with a central hole H. The outer shape of the rotor and stator need not be the same or similar. For example, the outer shape of the rotor part may be substantially circular, while the outer shape of the stator part has another shape, i.e. a shape that is not substantially circular. In the embodiments shown in FIGS. 9A and 9B, the stator part A comprises, or is coupled to, an attachment part 31 having a number of through-holes allowing the stator part to be fastened in place using e.g. screws or bolts. Instead of, or in addition to, the through-holes shown the attachment part 31 may be configured for attachment in other known ways. For example, the stator part A may be coupled to the frame of a bicycle via the attachment part 31. The circular discs of stator part A and rotor part B are arranged substantially parallel and are positioned in a contactless configuration with an airgap between them. The stator part A and rotor part B are rotatable in relation to each other and the system 1 is configured such that a stator inductor on stator part A can inductively couple to a rotor inductor on rotor part B.

The circular disc of rotor part B comprises, or is coupled to, a rigid second rotor disc 33 on which a strain gauge part 7, such as the strain sensor, is positioned. Rotor part B may comprise a mechanically rigid element to which one or more PCBs comprising the rotor electronics are adhered and it may be the mechanically rigid element which couples directly or indirectly to the second rotor disc 33. The second rotor disc is parallel to the rotor part B and the second rotor disc is configured to rotate together with rotor part B allowing for the strain gauge to measure the torque on the second rotor disc 33 as the rotor part B rotates. The sensor measurements are transferred from the rotor part B to stator part A through the coupling between the rotor inductor and stator inductor, for example through a circuitry such as that shown in FIG. 1.

The second rotor disc 33 may be constructed to have one or more indentations, holes and/or openings in the disc. Such indentations, holes and/or openings may act to lessen the strength of the second rotor disc material in one or more defined positions in such a way that the torque applied between the shaft 5 and a position on the second rotor disc causes a greater displacement at the defined position(s) compared to an otherwise similar second rotor disc that does not have the one or more indentations, holes and/or openings. Thus, a strain sensor positioned at such a defined position has an increased sensitivity to the applied torque. For example, as shown in FIGS. 9A and 9B, the second rotor disc 33 may be constructed to have an inner ring 35 at which the second rotor disc 33 is coupled to rotor part B, possibly via a mechanically rigid element as described elsewhere, and an outer ring 37 coupled to the inner ring 35 via one or more spokes/arms 39. In this construction, the spokes/arms 39 each comprise a defined position wherein rotation of the inner ring 35 causes a measureable displacement as the outer ring 37 is pulled by the spokes/arm 39. Alternatively, the second rotor disc 33 may be an integral part of rotor part B. Advantageously, a combined position and sensor system 1, wherein the strain-sensing element, i.e. the strain gauge, is positioned on a flat disc, which rotates with rotor part B, as shown herein, has a significantly smaller axial form factor than position an sensor systems in which a strain gauge is positioned on a shaft such as shown in e.g. FIGS. 2-5, which in turn have a smaller radial form factor.

Rotor part B may comprise or be coupled to a shaft 5 as shown in FIG. 9B. The shaft 5 may extend through the central hole H in the circular discs of the stator part A and rotor part B with its centreline E passing through the centres of the circular discs.

As in the embodiment shown in FIG. 2, the shaft 5 shown in FIG. 9B may be an output shaft, such as an output shaft of an electric motor, but can in reality be used in any setup, where it is advantageous to measure both the torque on a rotating shaft and angular position of the rotating shaft. For example, in electric bicycles, the shaft is connected to the crank arms (and they to the bicycle pedals) such that the strain sensor will, in theory, be able to measure the result of the entirety of the rider's input force applied to the pedals.

Except for the elements specifically described in connection with FIGS. 9A and 9B, the embodiments shown in FIGS. 9A and 9B may comprise elements and be configured as described elsewhere herein, for example as described in connection with FIG. 2-5 with appropriate changes where necessary.

Figure 10:
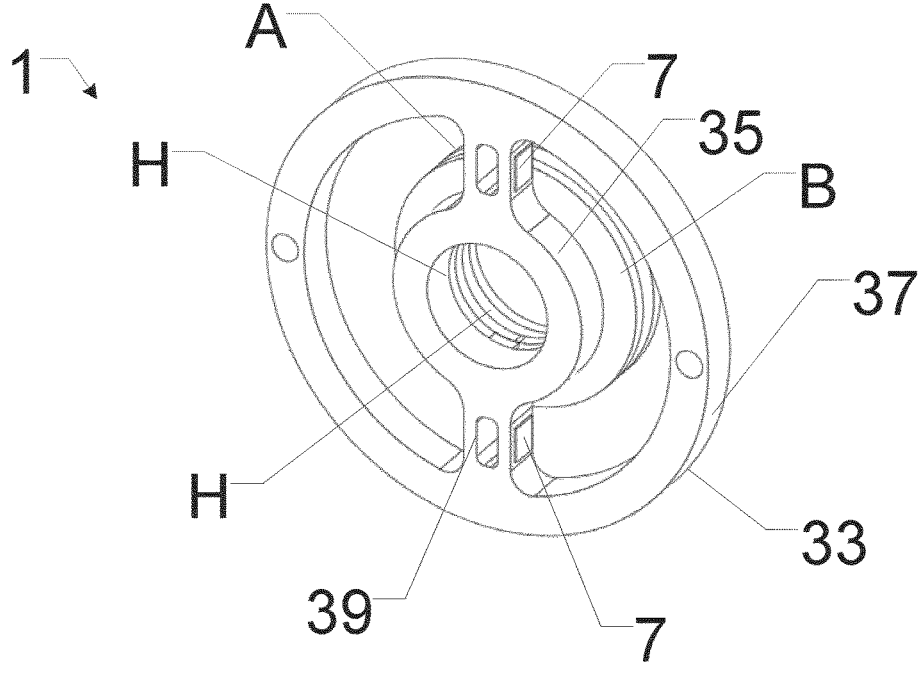
FIG. 10 shows an illustration of a combined position and sensor system according to some embodiments.

FIG. 10 shows an illustration of a combined position and sensor system 1 according to some embodiments. The combined position and sensor system 1 shown in similar to those shown in FIGS. 9A and 9B except that the strain sensor 7 is positioned on a side of a spoke/arm 33 between an inner ring 35 and an outer ring 37 of the second rotor disc 33. The strain sensor 7 is positioned such that it is substantially perpendicular to the plane in which the rotor is rotatable. In FIGS. 9A, 9B, and 10 the strain sensors 7 are visible as being positioned on one side of a spoke/arm 33, but another strain sensor may be positioned opposite on the other side of the same spoke/arm 33, which is not visible in the figures.

| LIST OF REFERENCES | |
| --- | --- |
| 1 | Combined position and sensor system |
| 2a | Circular coil of a stator/Stator inductor |
| 2b, 2c | Elliptical coil of a stator/Receiver inductor |
| 3 | Sensor(s) |
| 4a | Circular coil of rotor/Rotor inductor |
| 4b | Copper area of rotor/Target |
| 5 | Shaft |
| 6 | Disc of rotor part B |
| 7 | Strain gauge part |
| 9 | Rigid link |
| 11 | Air gap |
| 13 | Cut-out |
| 14 | Stator multilayer board |
| 15 | First surface of stator multilayer board |
| 17 | Second surface of stator multilayer board |
| 18 | Rotor board |
| 19 | First surface of rotor board |
| 21 | Second surface of rotor board |
| 23 | Conductive winding(s) |
| 25 | Connection wire |
| 27 | Electronics |
| 31 | Attachment part |
| 33 | Second rotor disc |
| 35 | Inner ring |
| 37 | Outer ring |
| 39 | Spoke/arm |
| A | Stator part |
| B | Rotor part |
| AC | Voltage source |
| D | Direction |
| E | Centreline of shaft |
| F | Cross-section through stator part |
| G | Cross-section through rotor part |
| H | Central hole |
| La | Stator inductor |
| La1, La2 | Receiver inductor |
| Lb | Rotor inductor |

The invention claimed is:

1. A combined position and sensor system comprising:
a stator part comprising a voltage source configured to generate an AC carrier signal, a stator inductor, and one or more receiver inductors,
a rotor part comprising a rotor inductor, one or more sensor components configured to generate sensor data, and one or more targets,
the rotor part and the stator part being rotatable in relation to each other in a contactless manner and configured such that the stator inductor and the rotor inductor are inductively coupled, whereby an AC current is induced in the rotor inductor, and the rotor part being configured to generate a DC current from the induced AC current,
the stator part and the rotor part being further configured to transmit the sensor data from rotor part to stator part via the inductive coupling between the stator inductor and the rotor inductor,
the one or more receiver inductors being coupled to the stator inductor through the one or more targets on the rotor part, and
the stator part being further configured to create a position-dependent signal based on the inductive coupling between the one or more receiver inductors and the stator inductor, the position-dependent signal having an amplitude, which is depending on the relative position of the one or more targets of the rotor.

2. A combined position and sensor system according to claim 1, wherein the stator part is further configured to determine the position, or a derivative thereof, of the rotor part relative to the stator part based on the position-dependent signal.

3. A combined position and sensor system according to claim 1, wherein the rotor part comprises a single target for determination of the position, or a derivative thereof, relative to the stator part.

4. A combined position and sensor system according to claim 1, wherein the stator part is further configured to create the position-dependent signal based on a coupling between the one or more receiver inductors and the stator inductor through a single target.

5. A combined position and sensor system according to claim 1, wherein the position-dependent signal used in the determination of the position, or a derivative thereof, of the rotor part relative to the stator part can be described as a continuous periodic function, such as a piecewise linear periodic function.

6. A combined position and sensor system according to claim 1, wherein the position-dependent signal used in the determination of the position, or a derivative thereof, of the rotor part relative to the stator part cannot be described as a sine or cosine function.

7. A combined position and sensor system according to claim 1, wherein the one or more receiver inductors are placed at a position-dependent distance from the stator inductor that can be described as a continuous periodic function.

8. A combined position and sensor system according to claim 1, wherein the one or more receiver inductors are placed at a position-dependent distance from the stator inductor that can be described as a piecewise linear continuous periodic function.

9. A combined position and sensor system according to claim 1, wherein the stator part comprises a single receiver inductor.

10. A combined position and sensor system according to claim 1, wherein the stator part is further configured to create the position-dependent signal based on coupling between the stator inductor and a single receiver inductor.

11. A combined position and sensor system according to claim 1, wherein the rotor part comprises, or is coupled to, a shaft.

12. A combined position and sensor system according to claim 11, wherein at least part of the sensor component is positioned on the shaft.

13. A combined position and sensor system according to claim 12, wherein the rotor part comprises, or is coupled to, a second rotor disc, and wherein at least part of the sensor component is positioned on the second rotor disc.

14. A combined position and sensor system according to claim 13, wherein the sensor component is a strain gauge sensor.

15. A combined position and sensor system according to claim 14, wherein the strain-sensing element of the strain gauge sensor is positioned on the second rotor disc.

16. A combined position and sensor system according to claim 14, wherein the strain-sensing element of the strain gauge sensor is positioned on the shaft.

17. A combined position and sensor system according to claim 1, wherein the stator part and the rotor part are separated by an air gap, the air gap separation being between 0.1 mm-5.0 mm.

18. A combined position and sensor system according to claim 1, wherein the stator inductor is shaped as an ellipse having an axis diameter that is between 5 mm-110 mm.

19. A combined position and sensor system according to claim 1, wherein the system further comprises, or is connected to, one or more processing units configured to calculate a measure of adjusted sensor data, the calculation comprising adjusting the acquired sensor data, the adjustment being a function of position data derived from the position-dependent signal.

20. A method of regulating power provided by a motor control system for an electric vehicle comprising an electric motor, the electric vehicle further comprising a combined position and sensor system, a rotor part of the combined position and sensor system being coupled to a rotatable shaft, and a stator part being coupled to a stationary part, the combined position and sensor system comprising:

the stator part comprising a voltage source configured to generate an AC carrier signal, a stator inductor, and one or more receiver inductors, the rotor part comprising a rotor inductor, one or more sensor components configured to generate sensor data, and one or more targets, the rotor part and the stator part being rotatable in relation to each other in a contactless manner and configured such that the stator inductor and the rotor inductor are inductively coupled, whereby an AC current is induced in the rotor inductor, and the rotor part being configured to generate a DC current from the induced AC current, the stator part and the rotor part being further configured to transmit the sensor data from rotor part to stator part via the inductive coupling between the stator inductor and the rotor inductor, the one or more receiver inductors being coupled to the stator inductor through the one or more targets on the rotor part, and the stator part being further configured to create a position-dependent signal based on the inductive coupling between the one or more receiver inductors and the stator inductor, the position-dependent signal having an amplitude, which is depending on the relative position of the one or more targets of the rotor, the combined position and sensor system being further configured to measure a torque applied to the rotatable shaft or to an element coupled to the rotatable shaft, and to provide a position-dependent signal indicative of the angular position of the rotor part relative to the stator part, the method comprising:

receiving, by a processing unit, the position-dependent signal and a signal indicative of the measured torque, calculating, by a processing unit, a measure of adjusted torque, the calculation comprising adjusting the measured torque as a function of the position-dependent signal, and controlling the power pushed to the electric motor based at least in part on the measure of adjusted torque.

\* \* \* \* \*